United States Patent
Ikeda

(10) Patent No.: US 7,264,085 B2
(45) Date of Patent: Sep. 4, 2007

(54) HYDRAULIC PASSAGE STRUCTURE OF AUTOMATIC TRANSMISSION FRICTION ELEMENT

(75) Inventor: Yoichi Ikeda, Shizuoka (JP)

(73) Assignee: Jatco Ltd, Shizuoka (JP)

( * ) Notice: Subject to any disclaimer, the term of this patent is extended or adjusted under 35 U.S.C. 154(b) by 477 days.

(21) Appl. No.: 10/617,787

(22) Filed: Jul. 14, 2003

(65) Prior Publication Data

US 2004/0014552 A1     Jan. 22, 2004

(30) Foreign Application Priority Data

Jul. 16, 2002  (JP)  ............................. 2002-207325

(51) Int. Cl.
*F16D 21/00*   (2006.01)
(52) U.S. Cl. .................. 184/6.12; 192/85 AA; 475/116
(58) Field of Classification Search ............. 184/6.1, 184/6.12; 192/85 R–85 AA, 87.11; 475/116, 475/146
See application file for complete search history.

(56) References Cited

U.S. PATENT DOCUMENTS

| | | | | |
|---|---|---|---|---|
| 2,984,122 | A | * | 5/1961 | Woolley ................. 74/606 R |
| 5,178,027 | A | | 1/1993 | Kobayashi et al. ........ 74/412 R |
| 5,437,355 | A | * | 8/1995 | Takagi et al. ............. 192/18 A |
| 5,480,014 | A | * | 1/1996 | Barton et al. ............. 192/48.3 |
| 5,483,850 | A | * | 1/1996 | Yamauchi ................. 74/606 R |
| 5,577,588 | A | * | 11/1996 | Raszkowski ........... 192/113.35 |
| 5,630,492 | A | * | 5/1997 | Yoshikawa et al. ...... 192/106 F |
| 6,110,069 | A | | 8/2000 | Taniguchi et al. |

FOREIGN PATENT DOCUMENTS

JP    2000-220704 A    8/2000

OTHER PUBLICATIONS

U.S. Appl. No. 10/619,724, filed Jul. 16, 2003, Ishimaru.
U.S. Appl. No. 10/614,827, filed Jul. 9, 2003, Tsuga.
U.S. Appl. No. 10/446,869, filed May 29, 2003, Tsuga.
U.S. Appl. No. 10/619,559, filed Jul. 16, 2003, Taguchi.
U.S. Appl. No. 10/617,788, filed Jul. 14, 2003, Choi.
U.S. Appl. No. 10/619,459, filed Jul. 16, 2003, Ishimaru.

* cited by examiner

*Primary Examiner*—Chong H. Kim
(74) *Attorney, Agent, or Firm*—Foley & Lardner LLP

(57) ABSTRACT

A hydraulic passage structure of an automatic transmission having at least one friction element for gearshift, the friction element being comprised of a drum. The hydraulic passage structure includes a housing formed integrally with a midway wall protruding inwardly from the housing, a sleeve, a center member joined integrally with the drum of the friction element, a radial passage in the midway wall, a sleeve passage in the sleeve, and a center member passage in the center member. The sleeve is fitted into an inner circumference of the housing, and the center member is inserted in an inner circumference of the sleeve. The sleeve passage connects with the radial passage of the housing, and the center member connects the sleeve passage and the friction element. Line pressure is supplied to the friction element via and in order of the radial passage, the sleeve passage, and the center member passage.

17 Claims, 6 Drawing Sheets

| GEAR \ F/E | C1 | C2 | C3 | B1 | B2 |
|---|---|---|---|---|---|
| FORWARD 1st | ○ | | | ○ | |
| FORWARD 2nd | ○ | | | | ○ |
| FORWARD 3rd | ○ | ○ | | | |
| FORWARD 4th | ○ | | ○ | | |
| FORWARD 5th | | ○ | ○ | | |
| FORWARD 6th | | | ○ | | ○ |
| REVERSE | | ○ | | ○ | |

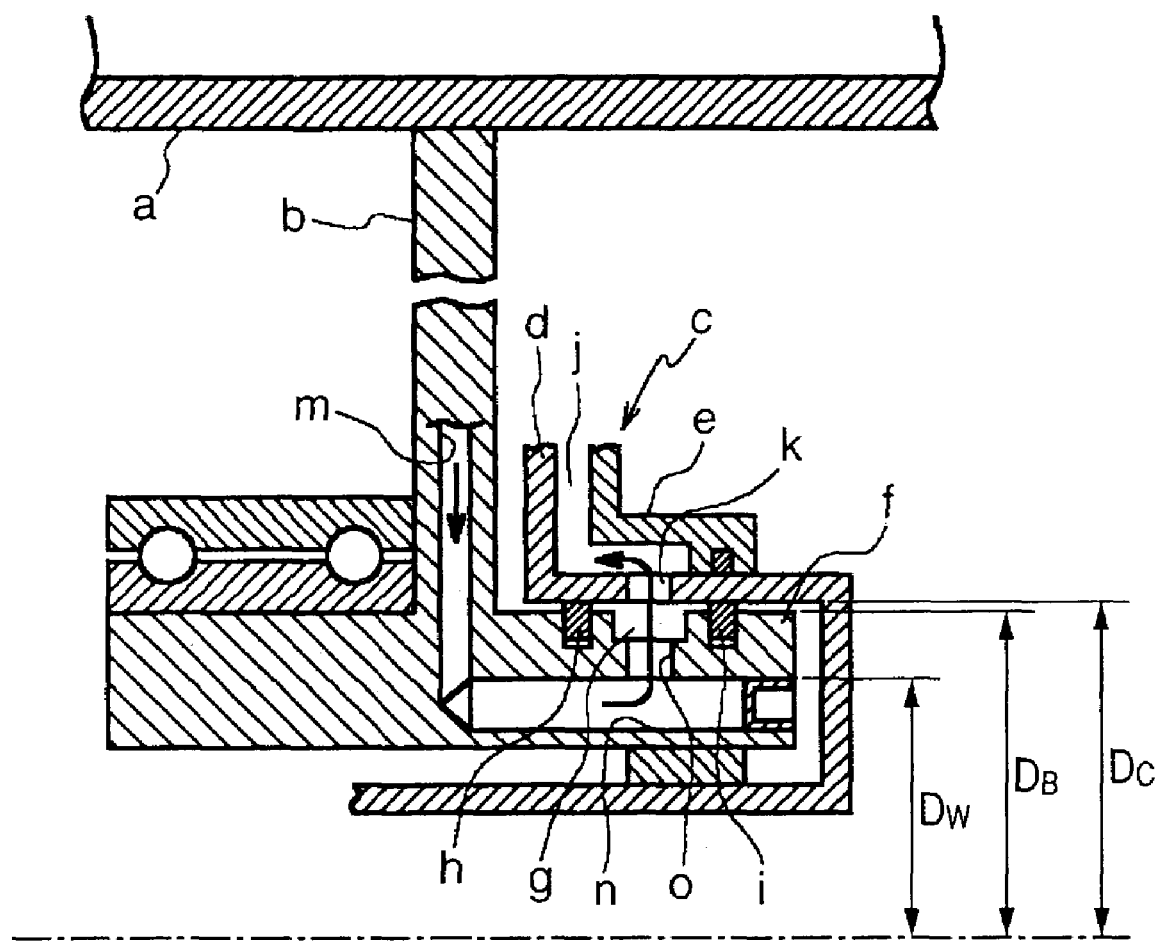

HYDRAULIC PASSAGE STRUCTURE OF AUTOMATIC TRANSMISSION FRICTION ELEMENT

The present invention relates to a hydraulic passage structure for friction elements which are responsible for gearshift control of an automatic transmission. In particular, it relates to a hydraulic passage structure for supplying fluid line-pressure via radial fluid passages in a midway wall to friction elements disposed adjacent to the midway wall, the midway wall being disposed within a transmission case perpendicularly to the axis of the transmission.

BACKGROUND OF THE INVENTION

The recent trend is to make automatic transmissions which are more stepped or graduated to provide slightly more forward gear ratios that can be selected so that shifting does not occur in too large steps, and therefore provide a smoother gearshift, as a way to realize improved fuel-efficiency and drivability. In order to realize this graduation of selectable gear ratios, gearshift assemblies have been designed for automatic transmissions which are formed by combining a reduction planetary gearset located in a front portion of the transmission nearest an engine which reduces rotation speed from the engine, and, a shift mechanism located in a rear portion of the transmission to receive the reduced rotation from the reduction planetary gearset. The reduction planetary gearset and the shift mechanism are separated by a midway wall which is disposed inside the transmission case perpendicularly to the axis of the transmission. Such a gearshift assembly also includes a direct clutch which transmits rotation from the engine directly to the shift mechanism, and allows several gear ratios to be selectable through a combination of engagement and disengagement of the direct clutch as well as engagement and disengagement of two clutches and brakes contained in the shift mechanism.

It is normal for supply of fluid pressure to a transmission friction element such as a clutch which exists adjacent to the midway wall to be delivered via radial passages formed in the midway wall. This simplifies the structuring of fluid passages to the friction element from a control valve body which is normally on the exterior of the transmission.

Japanese Patent Provisional Publication 2000-220704 discloses a typical hydraulic passage structure. This structure will now be discussed briefly with reference to FIG. 7. A clutch drum d is supported to be freely rotatable on a center boss portion f. Center boss portion f is formed as a single integral body with a midway wall b, and is disposed about an inner circumference of midway wall b to protrudingly extend in the axial direction, such that the inner circumference of midway wall b continues smoothly with an axial-direction hole n inside center boss portion f. Fluid pressure from a radial-direction oil passage m in midway wall b passes through and in order of an axial-direction hole n, a radial-direction hole o, a circumference groove g, and a drum hole k to reach a piston chamber j, to effect engagement of a clutch c. Seal rings h and i are disposed where clutch drum d fits over center boss portion f, to prevent leaking of fluid from both sides of circumference groove g.

SUMMARY OF THE INVENTION

However, in order to support clutch drum d to be freely rotatable on center boss portion f of midway wall b according to the related art, restrictions arise in the processing necessary to form the clutch fluid passage which includes groove g, the fitting grooves of seal rings h and i, and drum hole k.

Processing to form grooves g, h, and i and drum hole k involves bringing machining tools into proximity of the outer circumference of center boss portion f from a radial direction to carry out the processing. However, a transmission case a exists radially outward from center boss portion f, and makes such processing impossible or difficult. For this reason, midway wall b is formed as a separate part from transmission case a and is installed in transmission case a after processing of center boss portion f of midway wall b. This results in cost disadvantages including increased man-hours required for assembly.

Also, given that center boss portion f is set about the inner circumference of midway wall b to protrude axially so that clutch drum d can be supported to be freely rotatable thereon, a diameter $D_B$ of center boss portion f is necessarily larger than a diameter $D_W$ of the inner circumference of midway wall b. The result is that an inner diameter $D_C$ of clutch drum d and consequently an inner diameter of clutch piston e are unavoidably large, and an outer diameter of clutch piston e must be made large enough in order to maintain a necessary pressure surface area. This means that an automatic transmission which houses such an assembly must take on an undesirably large size in the radial direction.

It is also common practice to make midway wall b from the same material as transmission case a, thus midway wall b and therefore center boss portion f integral therewith are generally made of an aluminum alloy. Seal ring grooves holding seal rings h and i become worn when seal rings h and i rotate upon being pulled by clutch drum d which revolves relative to center boss portion f. There is therefore difficulty in maintaining seal effectiveness.

It is therefore an object of the present invention to provide a hydraulic passage structure of an automatic transmission friction element, which is capable of requiring fewer man-hours and therefore lower cost to assemble.

It is another object of the present invention to provide a hydraulic passage structure of an automatic transmission friction element, which is capable of having a smaller clutch drum inner diameter and therefore a smaller clutch piston inner diameter to avoid the problem of the transmission becoming large in the radial direction.

An aspect of the present invention resides in a hydraulic passage structure of an automatic transmission having at least one friction element for gearshift, the friction element comprising a drum, the hydraulic passage structure comprising a housing, a sleeve which is fitted into an inner circumference portion of the housing having a midway wall formed integrally therewith, the midway wall protruding inwardly from the housing, a center member joined integrally with the drum of the friction element, the center member being inserted in an inner circumference of the sleeve, a radial passage formed in the midway wall of the housing, a sleeve passage formed in the sleeve, the sleeve passage connecting with the radial passage of the housing, and a center member passage formed within the center member, the center member passage connecting the friction element and the sleeve passage, line pressure being supplied to the friction element via and in order of the radial passage, the sleeve passage, and the center member passage.

Another aspect of the present invention resides in a hydraulic passage structure of an automatic transmission having a case and at least one friction element, the hydraulic passage structure comprising a perpendicular portion which is formed inside the case integrally therewith, a sleeve which is fitted into an inner circumference portion of the perpendicular portion, a center shaft member connected to a drum of the friction element, and an oil passage network formed in the perpendicular portion, the sleeve, and the center shaft member, oil pressure being supplied to the friction element through the oil passage network starting in the perpendicular portion, then through the sleeve, and finally through the center shaft member.

The other objects and features of this invention will become understood from the following description with reference to the accompanying drawings.

BRIEF DESCRIPTION OF THE DRAWINGS

FIG. 7 is a cross-sectional view of a hydraulic passage structure of a clutch of the related art.

DETAILED DESCRIPTION OF THE INVENTION

Figures 1, 2:
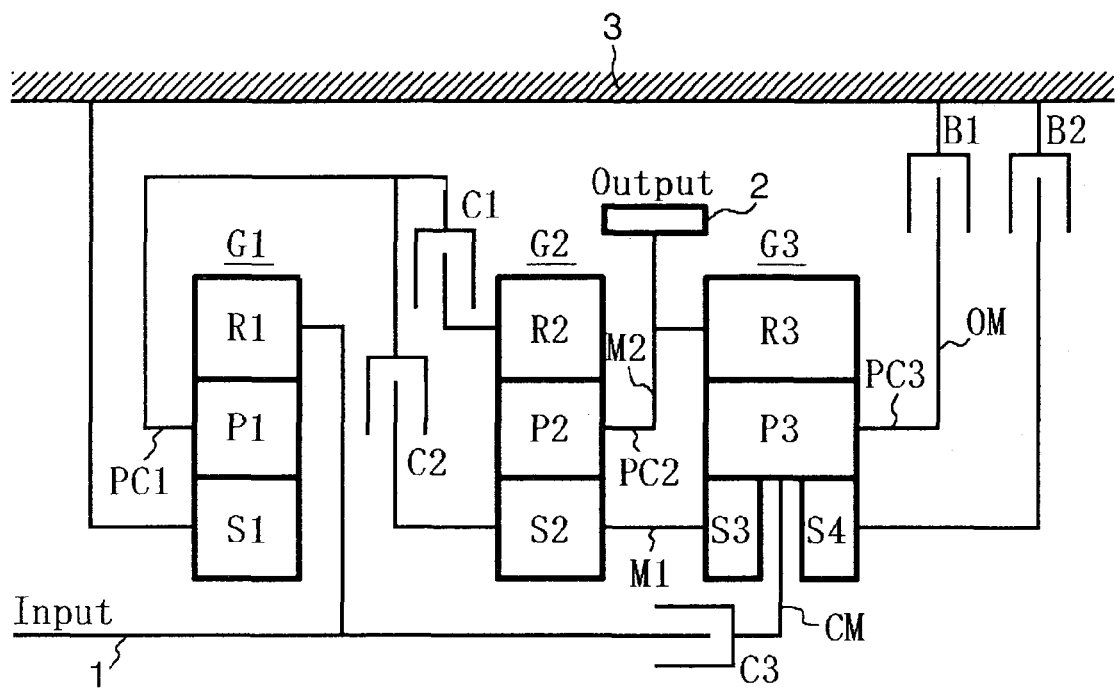
FIG. 1 is a skeleton diagram showing a gearshift assembly of an automatic transmission comprising an hydraulic passage structure according to the present invention.
FIG. 2 is a chart diagram of engagement logic showing a relationship between selectable gears and engagement of transmission friction elements of the same gearshift assembly.

Referring to the drawings, there is discussed an embodiment of a hydraulic passage structure of an automatic transmission friction element in accordance with the present invention.

Referring to FIG. 1, an automatic transmission comprises a first planetary gearset G1, a second planetary gearset G2, a third planetary gearset G3, a first connecting member M1, a second connecting member M2, a first clutch C1, a second clutch C2, a third clutch C3, a first brake B1, a second brake B2, an input member Input which is an input shaft, and an output member Output which is an output gear 2.

A gearshift assembly for an automatic transmission according to the present invention comprises, in order starting from the left side of FIG. 1 which is the side closest to input member Input, first planetary gearset G1 as a reduction apparatus comprising a single-pinion planetary gearset which has a single set of planet-pinions, second planetary gearset G2 which is single-pinion, and third planetary gearset G3 which is a double-sun-gear planetary gearset having two sun gears, all being disposed coaxially. Therefore, a gearshift assembly of an automatic transmission according to the present invention comprises first planetary gearset G1 serving as a reduction planetary gear, and, second planetary gearset G2 and third planetary gearset G3 in combination serving as a shift mechanism.

First planetary gearset G1, which is a single-pinion planetary gearset serving as a reduction planetary gear, comprises a first sun gear S1 which is immovably fixed, a first ring gear R1, first pinions P1 which mesh with first sun gear S1 and first ring gear R1, and a first carrier PC1 which supports first pinions P1 to be freely rotatable. Second planetary gearset G2 is a single-pinion planetary gearset comprising a second sun gear S2, a second ring gear R2, second pinions P2 which mesh with second sun gear S2 and second ring gear R2, and a second carrier PC2 which supports second pinions P2 to be freely rotatable.

Third planetary gearset G3 is a double-sun-gear planetary gearset comprising a third sun gear S3 and a fourth sun gear S4 disposed such that third sun gear S3 is closer to input member Input than fourth sun gear S4, third pinions P3 which mesh with both third sun gear S3 and fourth sun gear S4, a third carrier PC3 which supports third pinions P3 to be freely rotatable, and a third ring gear R3 which meshes with third pinions P3.

Third carrier PC3 comprises a center member CM which is joined thereto and extends radially from between third sun gear S3 and fourth sun gear S4 inward toward the axis, and an outer member OM which extends radially and outward away from the axis. Center member CM and outer member OM will be respectively explained later with reference to FIG. 3. Center member CM and outer member OM extend radially inward and outward and pass through space existing between individual pinions of third pinions P3.

Input member Input comprises an input shaft 1, and connects first ring gear R1 to an engine (not shown) via a torque converter (not shown), so that engine rotation can be inputted into first ring gear R1 through input shaft 1. Output member Output is comprised of an output gear 2, which is joined coaxially to second connecting member M2 which joins second carrier PC2 and third ring gear R3. Output rotation of the transmission is transmitted from output gear 2 to a final gear and differential gear assembly (not shown) and finally to the drive wheels of a vehicle.

First sun gear S1 of reduction planetary gearset G1 is immovably fixed to transmission case 3, and first carrier PC1 is appropriately joinable with second ring gear R2 by first clutch C1, as well as being appropriately joinable with second gear S2 by second clutch C2. Center member CM of third carrier PC3 is appropriately joinable with input shaft 1 by third clutch C3, therefore, third clutch C3 forms a direct clutch to transmit input rotation directly to the shift mechanism made up from second planetary gearset G2 and third planetary gearset G3. Outer member OM of third carrier PC3 of double-sun-gear planetary gearset G3 is appropriately joinable to transmission case 3 by first brake B1 so as to appropriately fix third carrier PC3, and fourth sun gear S4 is appropriately joinable to transmission case 3 by second brake B2 so as to be fixable.

It is possible to select gears, i.e., forward speeds 1st through 6th and reverse, with the gearshift assembly of the present invention through the corresponding combinations of friction elements first clutch C1, second clutch C2, third clutch C3, first brake B1, and second brake B2, as shown by the engagement logic table shown in FIG. 2, where engagement is represented by a circle mark and disengagement by being unmarked. A control valve body for controlling gear shift (not shown) is connected to first clutch C1, second clutch C2, and third clutch C3 as well as first brake B1 and second brake B2 to realize the engagement logic. As a control valve body for control of gear shift, a hydraulic type, an electronic type, or a combination type which combines these two types are employable.

The gear shift operation of the gearshift assembly according to the present invention will be now be explained.

(First gear) As shown in FIG. 2, first gear is achieved by engagement of first clutch C1 and first brake B1. In first gear, reduced rotation from first planetary gearset G1 is inputted into second ring gear R2 by engagement of first clutch C1 at second planetary gearset G2. And, because third carrier PC3 of third planetary gearset G3 is fixed to transmission case 3 by engagement of first brake B1, rotation of third sun gear S3 becomes a reverse-direction reduced rotation whereas output rotation from third ring gear R3 was a normal-direction rotation. Rotation of third sun gear S3 is then transmitted to second sun gear S2 of second planetary gearset G2 via first connecting member M1. Thus, a normal-direction reduced rotation is inputted from second ring gear R2, and a reverse-direction reduced rotation is inputted from second sun gear S2 of second planetary gearset G2, and reduced rotation from second ring gear R2 which has a further reduction in speed is outputted from second carrier PC2 via second joining member M2 to output gear 2.

(Second gear) As shown in FIG. 2, second gear is achieved by first brake B1 which was engaged in first gear disengaging, and instead second brake B2 engaging. Second gear is therefore achieved by engagement of first clutch C1 and second brake B2. In second gear, reduced rotation from first planetary gearset G1 is inputted into second ring gear R2 by engagement of first clutch C1 at second planetary gearset G2. And, fourth sun gear S4 of third planetary gearset G3 is fixed to transmission case 3 by engagement of second brake B2, so third sun gear S3 which is connected by third pinion P3 is fixed. Second sun gear S2 which is connected to third sun gear S3 through first connecting member M1 is then fixed to transmission case 3. Thus, at second planetary gearset G2, a normal-direction reduced rotation is inputted from second ring gear R2, and second sun gear S2 is fixed, resulting in rotation of a further reduced speed from second ring gear R2 being outputted to output gear 2 from second carrier PC2 through second joining member M2. This rotation is a higher speed than the rotation in first gear.

(Third gear) As shown in FIG. 2, third gear is achieved by second brake B2 which was engaged in second gear disengaging, and instead second clutch C2 engaging. Third gear is therefore achieved by engagement of first clutch C1 and second clutch C2. In third gear, reduced rotation from first planetary gearset G1 is inputted into second ring gear R2 of second planetary gearset G2 by engagement of first clutch C1. At the same time, this reduced rotation is inputted into second sun gear S2 by engagement of second clutch C2 at second planetary gear G2. Thus, the same reduced rotation from second ring gear R2 and second sun gear S2 of second planetary gearset G2 is inputted, resulting in second sun gear S2, second ring gear R2, second pinions P2, and second carrier PC2 being locked together to rotate as a single unit, and a reduced rotation the same as the rotation of reduction first planetary gearset G1 is outputted into output gear 2 through second joining member M2 from second carrier PC2.

(Fourth gear) As shown in FIG. 2, fourth gear is achieved by second clutch C2 which was engaged in third gear disengaging, and instead third clutch C3 engaging. Therefore fourth gear is achieved by engagement of first clutch C1 and third clutch C3. In fourth gear, reduced rotation is inputted into second ring gear R2 from first planetary gear G1 by engagement of first clutch C1 at second planetary gearset G2. And, input rotation from input shaft 1 is inputted into third carrier PC3 via center member CM by engagement of third clutch C3 at third planetary gearset G3. As a result, rotation of third sun gear S3 is faster than output rotation of third ring gear R3, and this faster rotation of third sun gear S3 is transmitted to second sun gear S2 via first joining member M1. Thus, reduced rotation from second ring gear R2 of second planetary gearset G2 is inputted, and a faster rotation from second sun gear S2 of second planetary gear G2 is inputted, resulting in a faster reduced rotation from second ring gear R2 being outputted to output gear 2 from second carrier PC2 via second joining member M2. This rotation is at a lower speed than the input rotation.

(Fifth gear) As shown in FIG. 2, fifth gear is achieved by first clutch C1 which was engaged in fourth gear disengaging, and instead second clutch C2 engaging. Therefore, fifth gear is achieved by engagement of second clutch C2 and third clutch C3. In fifth gear, reduced rotation from first planetary gearset G1 is inputted into third sun gear S3 through second sun gear S2 and first joining member M1 by engagement of second clutch C2. At the same time, input rotation from input shaft 1 is inputted into third carrier PC3 via center member CM by engagement of third clutch C3. Thus, input rotation is inputted into third carrier PC3 of third planetary gearset G3, and reduced rotation is inputted into third sun gear S3 of third planetary gearset G3 from first planetary gearset G1, resulting in rotation which is faster than the input rotation being outputted from third ring gear R3 via second connecting member M2 into output gear 2.

(Sixth gear) As shown in FIG. 2, sixth gear is achieved by second clutch C2 which was engaged in fifth gear disengaging, and instead second brake B2 engaging. Sixth gear is therefore achieved by engagement of third clutch C3 and second brake B2. In sixth gear, input rotation from input shaft 1 is inputted into third carrier PC3 via center member CM of third planetary gearset G3 by engagement of third clutch C3. Also, by engagement of second brake B2, fourth sun gear S4 of third planetary gear G3 is fixed to transmission case 3. Thus, input rotation is inputted into third carrier PC3 of third planetary gearset G3, and fourth sun gear S4 of third planetary gearset G3 is fixed to transmission case 3, resulting in rotation which is faster than input rotation being outputted to output gear 2 from third ring gear R3 via second connecting member M2.

(Reverse gear) As shown in FIG. 2, reverse gear is achieved by engagement of second clutch C2 and first brake B1. In reverse gear, reduced rotation from first planetary gearset G1 is inputted into third sun gear S3 via second sun gear S2 and first connecting member M1 by engagement of second clutch C2. And, third carrier PC3 is fixed to transmission case 3 by engagement of first brake B1. Thus, a normal-direction reduced rotation is inputted into third sun gear S3 of third planetary gearset G3, and third carrier PC3 of third planetary gearset G3 is fixed to transmission case 3, resulting in a reverse-direction rotation of a reduced speed from ring gear R3 being outputted to output gear 2 via second joining member M2.

Figure 3:
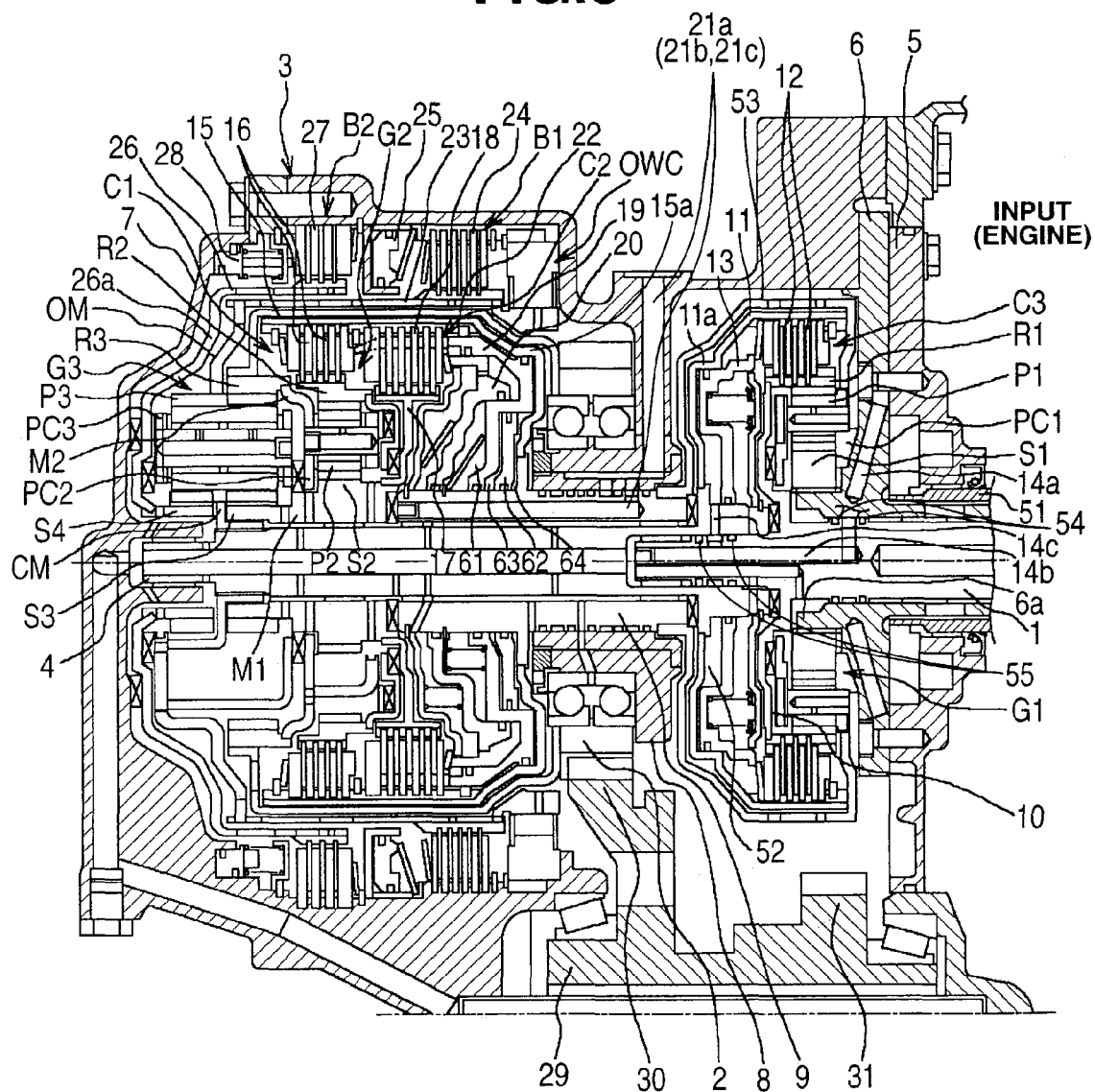
FIG. 3 is a cross-sectional view of the gearshift assembly shown in FIG. 1.

Below, in describing the present invention, the direction of input to output is from the right side to the left side in FIGS. 3, 4, 5, and 6, which is opposite to the FIG. 1 skeleton diagram. That is, an engine would be connected to the left side of the gearshift assembly in FIG. 1, but on the right side of the gearshift assembly in FIGS. 3, 4, 5, and 6. Referring to FIG. 3, Input shaft 1 and a middle shaft 4 are disposed inside transmission case 3 respectively in the axial direction so that a rear end of input shaft 1 is supported inside a front end of middle shaft 4 to form a fitting portion, such that input shaft 1 is coaxially rotatable relative to middle shaft 4. Input shaft 1 and middle shaft 4 are supported to be individually freely rotatable with respect to transmission case 3.

A front end opening of transmission case 3 which is near to input shaft 1 is closed by an oil pump comprising a pump housing 5 and a pump cover 6. Input shaft 1 passes through the oil pump to be axially supported thereby. A protruding end of input shaft 1 is connectable to an engine (not shown) to receive power via a torque converter (not shown). Further, elements constituting the oil pump such as a gear pump which would be disposed inside the oil pump are omitted from FIGS. 3 through 6 for purposes of clarity. A gear pump is connected to the engine via a pump drive shaft 51, such that the oil pump would be constantly driven by the engine.

A rear end of middle shaft 4 which is far from input shaft 1 is supported to be freely rotatable by a case end 7 at a rear end of transmission case 3. A midway wall 8 is disposed approximately halfway axially within transmission case 3, and output gear 2 is supported to be freely rotatable by midway wall 8. A hollow shaft 9 is disposed in a center opening of midway wall 8, and the fitting portion of input shaft 1 and middle shaft 4 is supported to be freely rotatable inside hollow shaft 9 by the center opening of midway wall 8.

First planetary gearset G1 is disposed in the area existing toward the front of the transmission between midway wall 8 and the oil pump comprised of pump housing 5 and pump cover 6 as shown in FIG. 3, and third clutch C3 is disposed so as to enclose first planetary gearset G1. First sun gear S1 of first planetary gearset G1 is serration fitted to a clutch boss portion 6a which is integral with and protrudes from the rear of pump cover 6 to be permanently non-rotatable so as to function as a reaction force stopper. First ring gear R1 of first planetary gearset G1, which serves as a rotation input member, is joined to an outer circumference of a flange 10 which extends from input shaft 1 in the radial direction outward away from the axis.

A clutch drum 11 is disposed so as to enclose first ring gear R1, being made to extend radially outward away from the axis from the front end of middle shaft 4 which is near input shaft 1. Third clutch C3 which acts as a direct clutch is comprised of a clutch pack 12 and is disposed about an outer circumference of first planetary gearset G1 which is a reduction planetary gear. Clutch pack 12 comprises alternating clutch plates respectively splined to an inner circumference of clutch drum 11 and an outer circumference of first ring gear R1. First ring gear R1 also serves as a clutch hub of third clutch C3. Further, a clutch piston 13, which is a servo-piston of third clutch C3, is disposed on a side of first planetary gearset G1 away from the oil pump comprised of pump housing 5 and pump cover 6, and is slidably fitted to the front end of middle shaft 4 and a cylinder 11a of clutch drum 11 which faces first planetary gearset G1.

Servo-chamber 52, which exists between clutch piston 13 of third clutch C3 and cylinder 11a of clutch drum 11, is connected to the control valve body (not shown) via fluid passages of third clutch C3 which comprise a fluid passage 14a formed in pump cover 6, a fluid passage 14b formed in input shaft 1, and fluid passage 14c formed in middle shaft 4. A connecting portion between oil passages 14a and 14b is sealed by seal rings 54 existing in a fitting portion where input shaft 1 is fitted inside of pump cover 6. A connecting portion between oil passages 14b and 14c is sealed by seal rings 55 existing in the fitting portion of input shaft 1 and middle shaft 4. Fluid pressure is supplied to clutch piston 13 of third clutch C3 from the control valve body via fluid passages 14a, 14b, and 14c to cause clutch piston 13 to travel to the right of FIGS. 3, 4, 5, and 6 to effect engagement of clutch C3. A connecting shell 53 which is drum-shaped extends from a front end of hollow shaft 9 radially outward away from the axis, continues on to enclose third clutch C3, and continues further so that a front end thereof is joined to first carrier PC1. As obvious from the previous explanation, first carrier PC1 serves as a rotation output member of first planetary gearset G1 which is used as a reduction planetary gear.

A shift mechanism comprising second planetary gearset G2, third planetary gearset G3, first clutch C1, second clutch C2, first brake B1, second brake B2, is disposed in the area existing toward the rear of the transmission between case end 7 and midway wall 8 as shown in FIG. 3. Both second planetary gearset G2 and third planetary gearset G3 are disposed about and enclose middle shaft 4, and second planetary gearset G2 is disposed axially closer to input shaft 1 than third planetary gearset G3. Second sun gear S2 of second planetary gearset G2 and third sun gear S3 of third planetary gearset G3 are integrally joined to be a single body by first connecting member M1 and are supported to be freely rotatable about middle shaft 4. A clutch drum 15 extends radially outward away from the axis from about halfway of hollow shaft 9, continues on to extend axially toward the rear of the transmission, and continues to extend somewhat beyond an outer circumference of second ring gear R2, and hollow shaft 9 forms a center shaft portion of clutch drum 15. First clutch C1 is comprised of a clutch pack 16. Clutch pack 16 comprises alternating clutch plates respectively splined to an inner circumference of clutch drum 15 and an outer circumference of second ring gear R2. In this way, first clutch C1 is disposed about an outer circumference of second planetary gearset G2 which is single-pinion, and second ring gear R2 also serves as a clutch hub of first clutch C1.

In the manner described above, second clutch C2 is disposed axially closer to input shaft 1 than first clutch C1 which is disposed about the outer circumference of second planetary gearset G2, that is, second clutch C2 is disposed farther from third planetary gearset G3 which is double-sun-gear, so a clutch hub 17 which extends radially outward away from the axis is fixedly installed at an outer edge of an input shaft of second sun gear S2. Second clutch C2 is comprised of a clutch pack 18. Clutch pack 18 comprises alternating clutch plates respectively splined to an inner circumference of clutch drum 15 and an outer circumference of clutch hub 17. Further, a clutch piston 19 of first clutch C1 and a clutch piston 20 of second clutch C2 form a double piston which is disposed on a side of second clutch C2 away from first clutch C1, clutch piston 20 being slidable on an inner side of clutch piston 19. An outer circumference of clutch piston 19 is fitted to be freely slidable on an inner circumference of a cylinder 15a of clutch drum 15 which faces second planetary gear G2. Respective outer circumferences of clutch piston 19 and clutch piston 20 are fitted to be freely slidable on an outer circumference of hollow shaft 9, which is also a center shaft portion of clutch drum 15. A servo-chamber 61 exists between clutch piston 19 and clutch piston 20, and another piston 62 is fitted between piston 19 and hollow shaft 9 such that a servo-chamber 63 and a servo-chamber 64 are formed on either side of piston 62. Referring to FIGS. 3 through 6, servo-chambers 61, 63, and 64 receive fluid line-pressure from individual fluid passages 21c, 21b, and 21a respectively which are formed in midway wall 8 and hollow shaft 9 to cause clutch piston 19 and clutch piston 20 to travel, such that first clutch C1 and second clutch C2 are separately and individually engageable depending on the capacity of line pressure introduced to servo-chambers 61, 63, and 64 respectively.

As mentioned before, third planetary gearset G3 is a double-sun-gear planetary gearset, and third pinions P3 are relatively long in order to mesh with both third sun gear S3 and fourth sun gear S4. However, a width of third ring gear R3 does not need to be as large as that of third pinions P3, and therefore third ring gear R3 is fabricated so that a face width of the teeth thereof is smaller than a face width of the teeth of third pinions P3. By third ring gear R3 being meshed with third pinions P3 at an end portion of third pinions P3 near second planetary gear G2, second connecting member M2 which joins third ring gear R3 and second carrier PC2 of second planetary gearset G2 can be designed smaller. A cylindrical connecting member 22 is disposed so as to enclose clutch drum 15 of first clutch C1 and second clutch C2, and one end thereof is attached to an outer circumference of third ring gear R3, and another end thereof is attached to output gear 2.

At third planetary gearset G3, as explained before, center member CM is disposed on third carrier PC3 so as to extend from between third sun gear S3 and fourth sun gear S4 radially inward toward the axis, and outer member OM is disposed at a position approximately axially halfway of third pinions P3 on third carrier PC3 so as to extend radially outward away from the axis and along an end face of third ring gear R3. Center member CM is connected to middle shaft 4 so that power can be transmitted from middle shaft 4, and in this manner third carrier PC3 is connected to clutch drum 11 of third clutch C3 via center member CM and middle shaft 4. A brake hub 23 is joined to an outer circumference of outer member OM, and brake hub 23 is disposed about an outer circumference of cylindrical connecting member 22 and is made to extend in the direction of the front of the transmission to within proximity of midway wall 8. First brake B1 is comprised of a brake pack 24. Brake pack 24 comprises alternating brake plates respectively splined to an inner circumference of transmission case 3 and an outer circumference of a front end of brake hub 23. First brake B1 is appropriately engageable by a brake piston 25 which is fitted to the inside of transmission case 3 behind brake pack 24.

A brake hub 26 is disposed so as to overlap a rear end of brake hub 23. A rear wall 26a of brake hub 26 is extended from behind brake hub 26 along and behind third planetary gearset G3 inward toward the axis, after which an inner circumference of rear wall 26a of brake hub 26 is joined to fourth sun gear S4 of third planetary gearset G3. Second brake B2 is comprised of a brake pack 27. Brake pack 27 comprises alternating brake plates respectively splined to an inner circumference of transmission case 3 and an outer circumference of brake hub 26. Second brake B2 is appropriately engageable by brake piston 28 which is fitted to the inside of transmission case 3 behind brake pack 27. According to the heretofore explained structure, first brake B1 and second brake B2 are respectively disposed about an outer circumference of first clutch C2 and second clutch C1. First brake B1 is disposed nearer to input shaft 1 and first planetary gearset G1 than second brake B2. First brake B1 and second brake B2 are disposed nearer to second planetary gearset G2 than third planetary gearset G3.

Further, a one-way clutch OWC omitted in the skeleton diagram of FIG. 1 is disposed between a front end of brake hub 23 of first brake B1 and transmission case 3. Forward first gear is achievable with first brake B1 in a disengaged state since rotation of third carrier PC3 in one direction is stopped by one-way clutch OWC. However, in first gear achieved by one-way clutch OWC, reverse-direction rotation of third carrier PC3 during engine braking is allowed by one-way clutch OWC, so engine braking is not effective in this case. When engine braking is required, first brake B1 is engaged so that reverse-direction rotation of third carrier PC3 is stopped.

Separately, as shown in FIG. 3, a countershaft 29 which is parallel with input shaft 1 and middle shaft 4 is supported to be freely rotatable inside transmission case 3, and a countergear 30 and a final drive pinion gear 31 are formed integrally therewith. Counter gear 30 meshes with output gear 2, and a differential gear assembly, not shown, exists between vehicle drive wheels and meshes with final drive pinion 31.

Figure 4:
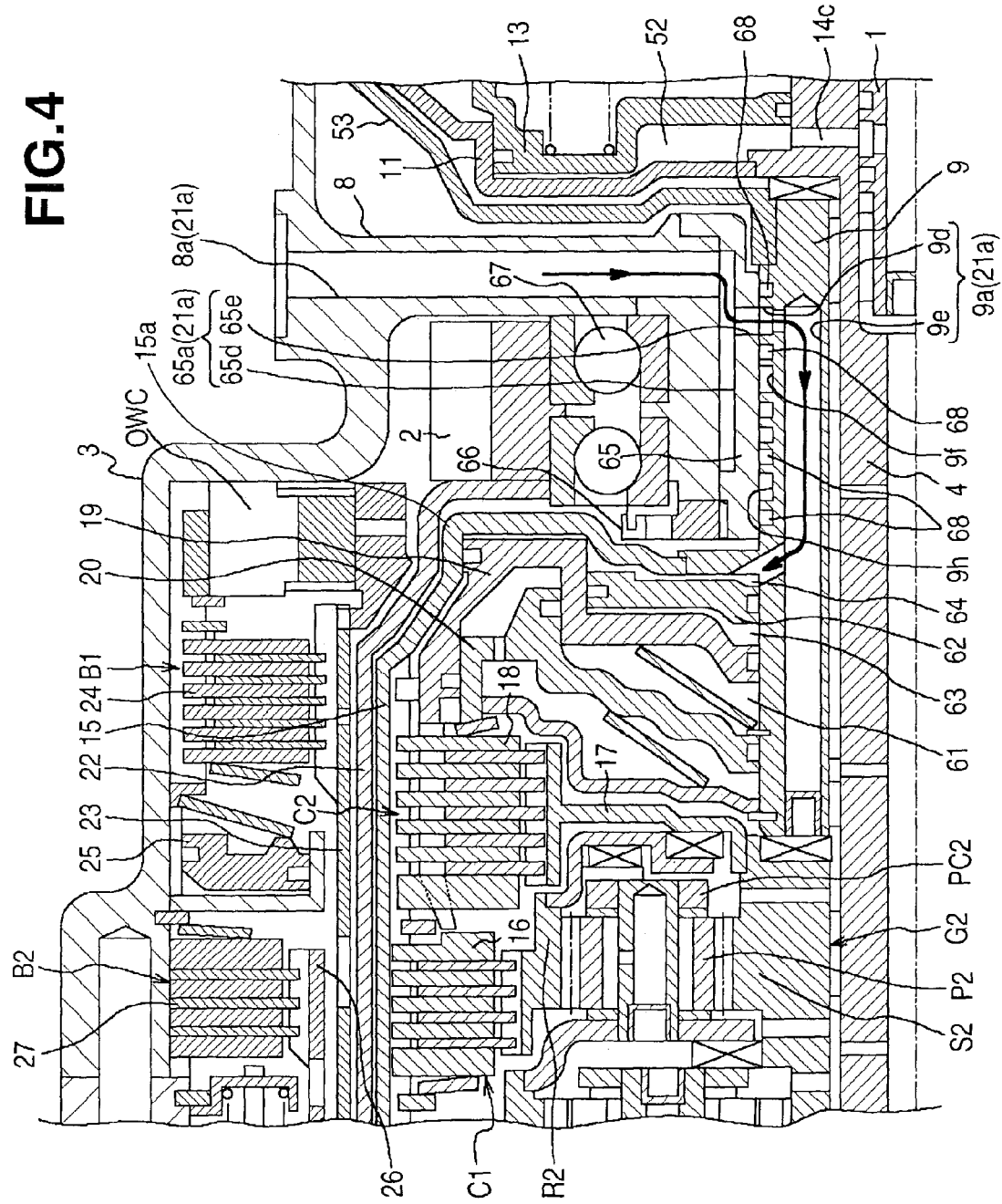
FIG. 4 is an enlarged cross-sectional view showing detail of a large-capacity passage structure of a first clutch of the same gearshift assembly.
Figure 5:
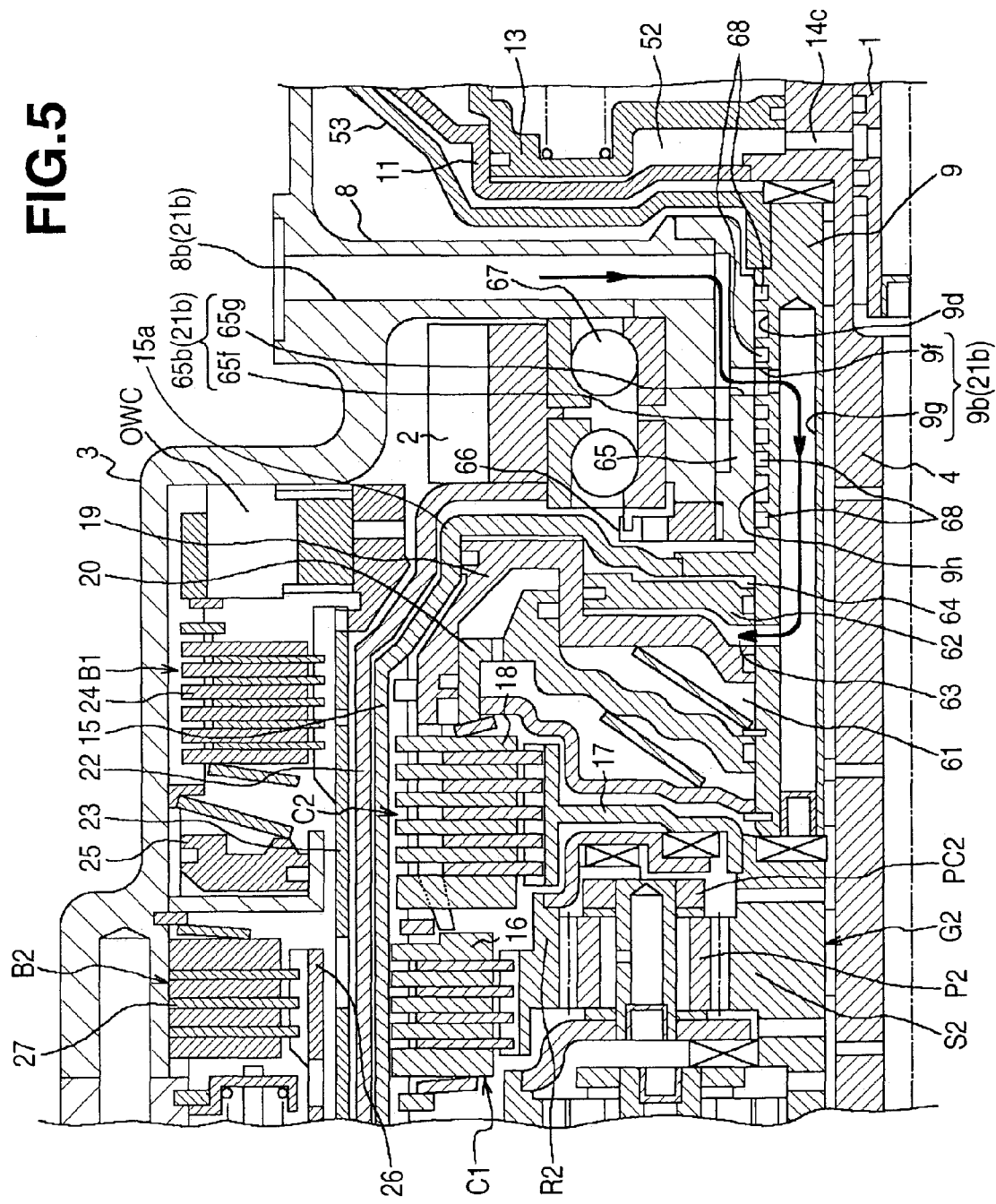
FIG. 5 is an enlarged cross-sectional view showing detail of a small-capacity passage structure of the first clutch of the same gearshift assembly.
Figure 6:
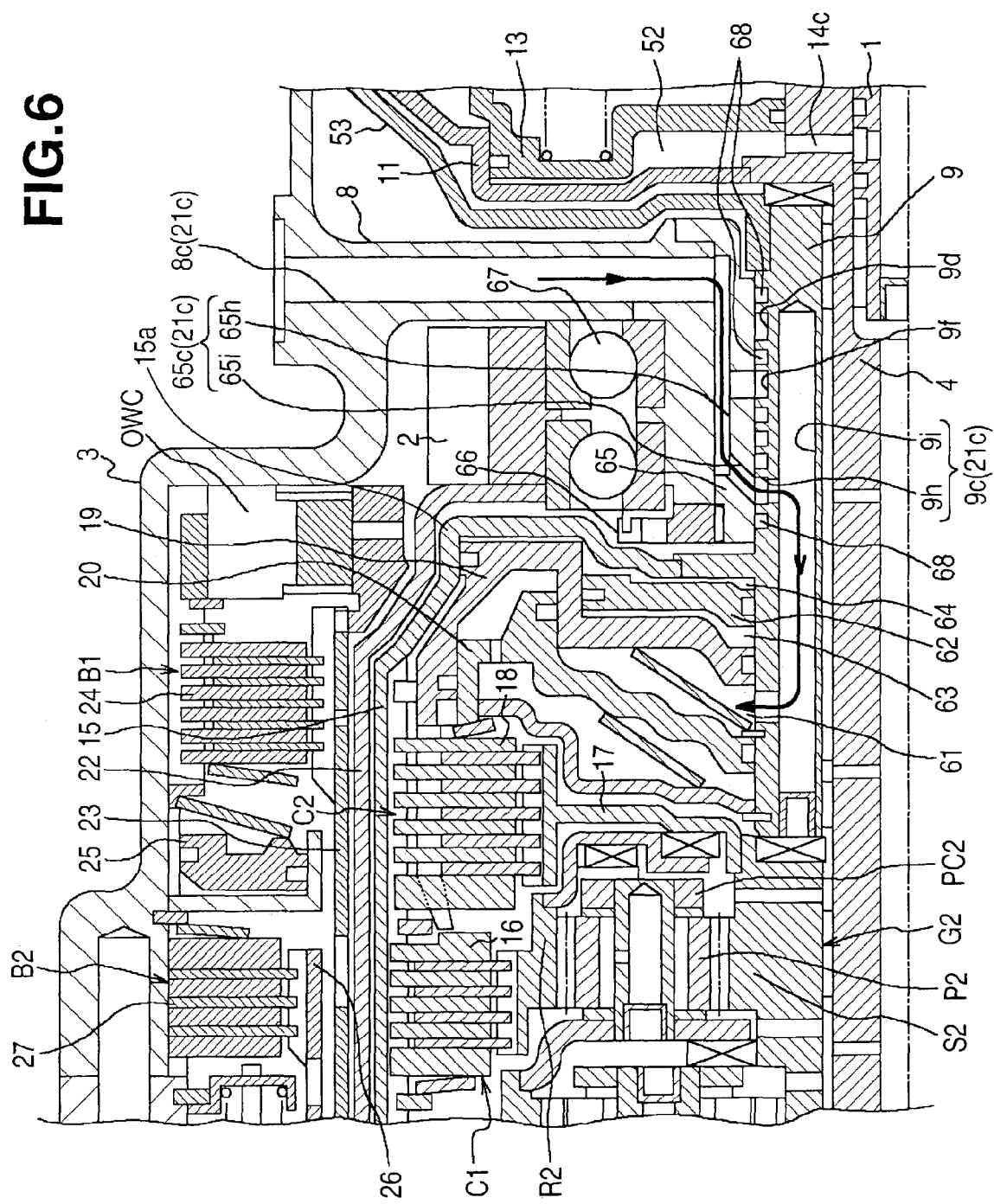
FIG. 6 is an enlarged cross-sectional view showing detail of a hydraulic passage structure of a second clutch of the same gearshift assembly.

As shown respectively in FIG. 4, FIG. 5, and FIG. 6, fluid passages 21a, 21b, and 21c supply fluid pressure to respective servo-chambers 64, 63, and 61 of second clutch C2 and first clutch C1. FIG. 4 shows detail of fluid passage 21a, also shown in FIG. 3, which supplies fluid pressure to servo-chamber 64. A sleeve 65, preferably made from a ferro-alloy, is fitted into an inner circumference of an axially protruding center boss portion of midway wall 8 which supports output gear 2. In the fitting process, sleeve 65 is first inserted as far as possible into the inner circumference of center boss portion of midway wall 8 from one end axially, which is from the right according to FIG. 4. Sleeve 65 is then attached to midway wall 8 by nuts 66 screwed on at an insertion lead end thereof. Nuts 66 also serve to prevent bearings 67 from loosening, bearings 67 supporting output gear 2 to be freely rotatable on an outer circumference of the center boss portion of midway wall 8.

Hollow shaft 9, which is also a center shaft portion of clutch drum 15, is fitted into an inner circumference of sleeve 65 and supported on the inner circumference of midway wall 8. A first fluid passage 65a of sleeve 65 is comprised of an axial groove 65d which is formed on an outer circumference of sleeve 65 so as to connect with a radial fluid passage 8a of midway wall 8, and a radial opening 65e which is formed in a bottom surface of axial groove 65d. A second fluid passage 9a of hollow shaft 9 is comprised of a circumference groove 9d which is formed on the outer circumference of hollow shaft 9 to connect with radial opening 65e of sleeve 65, and an axial hole 9e which is formed in hollow shaft 9 so as to connect with circumference groove 9d and with servo-chamber 64.

Fluid passage 21a for servo-chamber 64 is comprised as shown by the detail in FIG. 4 (see also FIG. 3) of radial fluid passage 8a of midway wall 8, first fluid passage 65a of sleeve 65, and second fluid passage 9a of hollow shaft 9. As shown by the arrow in FIG. 4, fluid pressure is supplied to servo-chamber 64 through and in order of radial fluid passage 8a, first fluid passage 65a, and second fluid passage 9a. Although first through fourth gears require engagement of first clutch C1 as seen in FIG. 2, first through third gears especially require an engagement capacity of first clutch C1 to be large. A large engagement capacity which can be provided by clutch piston 19 and piston 62 is required when any of first through third gears are selected, and so fluid pressure is supplied to servo-chamber 64 to effect engagement of first clutch C1 through both of clutch piston 19 and piston 62. When supplying fluid pressure to servo-chamber 64, engagement capacity of first clutch C1 is the same even if fluid pressure is supplied to servo-chamber 63, 50 fluid pressure can be pre-supplied to servo-chamber 63 in first through third gears, and then further fluid pressure can be supplied to servo-chamber 63 when necessary, such as when fourth gear is selected. Thus, in fourth gear, engagement of first clutch C1 is not realized by fluid pressure being supplied to servo-chamber 64, but rather it is realized only by supply of fluid pressure to servo-chamber 63 which has a smaller pressure surface area. It is therefore possible to have a small engagement capacity of first clutch C1 for fourth gear.

As explained above fluid passage 21b, which supplies fluid pressure to servo-piston 63 in first through fourth gears, is comprised as shown by the detail in FIG. 5 (see also FIG. 3). A first fluid passage 65b is comprised of an axial groove 65f which is formed on the outer circumference of sleeve 65 so as to connect with a radial fluid passage 8b of midway wall 8, and a radial opening 65g which is formed in a bottom surface of axial groove 65f. A second fluid passage 9b of hollow shaft 9, which is also a center shaft portion of clutch drum 15 is comprised of a circumference groove 9f which is formed on the outer circumference of hollow shaft 9 so as to connect with radial opening 65g of sleeve 65, and an axial hole 9g which is formed in hollow shaft 9 so as to connect with circumference groove 9f and with servo-chamber 63.

Fluid passage 21b for servo-chamber 63 is comprised of radial fluid passage 8b of midway wall 8, first fluid passage 65b of sleeve 65, and second fluid passage 9b of hollow shaft 9. Fluid pressure is supplied to servo-chamber 63 through and in order of radial fluid passage 8b, first fluid passage 65b, and second fluid passage 9b as shown by the arrow in FIG. 5.

FIG. 6 shows detail of fluid passage 21c (see also FIG. 3) which supplies fluid pressure to servo-chamber 61. A first fluid passage 65c of sleeve 65 is comprised of an axial groove 65h which is formed on the outer circumference of sleeve 65 so as to connect with a radial fluid passage 8c of midway wall 8, and a radial opening 65i which is formed in a bottom surface of axial groove 65h. A second fluid passage 9c of hollow shaft 9, which is also a center shaft portion of clutch drum 15 is comprised from a circumference groove 9h which is formed on the outer circumference of hollow shaft 9 so as to connect with radial opening 65i of sleeve 65, and an axial hole 9i which is formed in hollow shaft 9 so as to connect with circumference groove 9h and with servo-chamber 61.

Fluid passage 21c for servo-chamber 61 is comprised of radial fluid passage 8c of midway wall 8, first fluid passage 65c of sleeve 65, and second fluid passage 9c of hollow shaft 9. Fluid pressure is supplied to servo-chamber 61 through and in order of radial fluid passage 8c, first fluid passage 65c, and second fluid passage 9c as shown by the arrow in FIG. 6. Supply of fluid pressure to servo-chamber 61 is supplied to execute engagement of second clutch C2 in third gear, fifth gear, and reverse gear as shown in FIG. 2.

According to the hydraulic passage structure of first clutch C1 and second clutch C2 in accordance with this embodiment of the present invention, fluid passages 21a through 21c are comprised of radial fluid passages 8a through 8c of midway wall 8, first fluid passages 65a through 65c of sleeve 65, and second fluid passages 9a through 9c of hollow shaft 9 which is also a center shaft portion of clutch drum 15, therefore, it is necessary only to provide radial fluid passages 8a through 8c in midway wall 8, eliminating the need for machining to form other fluid passages, making it possible to form midway wall 8 integrally with transmission case 3 as shown in FIGS. 3 through 6. Thus, an extended number of man-hours necessary for processing can be avoided, meaning there is an improvement in cost-effectiveness.

Also, because hollow shaft 9 forms a center shaft portion of clutch drum 15 and is fitted into the inner circumference of sleeve 65 which is attached to the inner circumference of midway wall 8, it is possible to make an inner diameter of clutch drum 15 smaller than a diameter of the inner circumference of midway wall 8 with certainty. And, it is therefore possible to make respective outer diameters of clutch pistons 19 and 20 smaller while maintaining respective necessary pressure surface areas thereof, so that the problem of an automatic transmission becoming large in the radial direction can be avoided.

In addition, there is no need to form sleeve 65 of the same material as transmission case 3 and midway wall 8 since it is possible to fabricate sleeve 65 from any preferred hard material such as a ferro-alloy. The beneficial effect gained from this is that even though seal rings 68 are in sliding contact with the inner circumference of sleeve 65, being disposed where there is relative rotation between sleeve 65 and hollow shaft 9 as shown in FIGS. 4 through 6, it is possible to prevent wearing of sleeve 65 due to seal rings 68 such that initial seal effectiveness is maintained without any long-term change.

Further, according to this embodiment of the present invention, sleeve 65 is inserted from one end in an axial direction and attached to midway wall 8 by nuts 66 screwed at the insertion lead end thereof, meaning that work necessary to install sleeve 65 is greatly enhanced.

Also according to this embodiment of the present invention, first fluid passages 65a through 65c of sleeve 65 respectively comprise axial grooves 65d, 65f, and 65h formed in the outer circumference of sleeve 65, and respectively radial openings 65e, 65g, and 65i formed in the respective bottom surfaces of axial grooves 65d, 65f, and 65h so as to connect with radial fluid passages 8a through 8c of midway wall 8 respectively, so there is an improvement in processing required to form first fluid passages 65a through 65c, which leads to improved cost-efficiency.

Moreover, according to this embodiment of the present invention, second fluid passages 9a, 9b, and 9c of hollow shaft 9, which is also a center shaft portion of clutch drum 15, comprise circumference grooves 9d, 9f, and 9h formed in the outer circumference of hollow shaft 9 to connect respectively with radial openings 65e, 65g, and 65i of sleeve 65, and axial holes 9e, 9g, and 9i which are formed in hollow shaft 9 so as to connect with respective circumference grooves 9d, 9f, and 9h and respectively with servo-chambers 64, 63, and 61. It is therefore possible to easily form second fluid passages 9a, 9b, and 9c of hollow shaft 9.

This application is based on a prior Japanese Patent Application No. 2002-207325. The entire contents of a Japanese Patent Application No. 2002-207325 with a filing date of Jul. 16, 2002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hydraulic passage structure of an automatic transmission having at least one friction element for gearshift, the friction element comprising a drum, the hydraulic passage structure comprising:

a housing;
a sleeve which is fitted into an inner circumference portion of the housing;
a center member joined integrally with the drum of the friction element, the center member being inserted in an inner circumference of the sleeve;
a radial passage formed in the housing;
a sleeve passage formed in the sleeve, the sleeve passage connecting with the radial passage of the housing; and
a center member passage formed within the center member, the center member passage connecting the friction element and the sleeve passage, line pressure being supplied to the friction element via and in order of the radial passage, the sleeve passage, and the center member passage, wherein the sleeve passage comprises a plurality of axial grooves which connects with the radial passage of the housing, each axial groove having an opening formed therein which connects to the center member passage.

2. The hydraulic passage structure as claimed in claim 1, wherein the sleeve is made from a harder material than the housing and inserted from an axial direction into the inner circumference portion of the housing.

3. The hydraulic passage structure as claimed in claim 1, wherein the sleeve is made from a ferro-alloy.

4. The hydraulic passage structure as claimed in claim 3, wherein the sleeve is inserted from an axial direction into the inner circumference portion of the housing, and fixed to the housing.

5. The hydraulic passage structure as claimed in claim 4, wherein the sleeve is fixed at an insertion lead end thereof to the housing by a plurality of nuts.

6. The hydraulic passage structure as claimed in claim 1, wherein the center member passage comprises an external passage which connects with the sleeve passage, and an internal passage which connects the external passage and the friction element.

7. The hydraulic passage structure as claimed in claim 1, wherein the housing comprises a midway wall which is formed integrally therewith, the radial passage of the housing being formed in the midway wall.

8. A hydraulic passage structure of an automatic transmission having at least one friction element for gearshift, the friction element comprising a drum, the hydraulic passage structure comprising:

a housing;

a sleeve which is fitted into an inner circumference portion of the housing;

a center member joined integrally with the drum of the friction element, the center member being inserted in an inner circumference of the sleeve;

a radial passage formed in the housing;

a sleeve passage formed in the sleeve, the sleeve passage connecting with the radial passage of the housing; and a center member passage formed within the center member, the center member passage connecting the friction element and the sleeve passage, line pressure being supplied to the friction element via and in order of the radial passage, the sleeve passage, and the center member passage, wherein the center member passage comprises a plurality of circumference grooves formed in an outer circumference thereof which connect with the sleeve passage, and a plurality of axial holes which connects the plurality of circumference grooves and the friction element.

9. The hydraulic passage structure as claimed in claim 8, wherein the sleeve passage comprises an outer circumference passage which connects with the radial passage of the housing.

10. The hydraulic passage structure as claimed in claim 9, wherein the sleeve passage further comprises a plurality of holes which connects the outer circumference passage with the center member passage.

11. The hydraulic passage structure as claimed in claim 8, wherein the sleeve passage comprises an outer circumference passage which connects with the radial passage of the housing, and a plurality of holes formed in the outer circumference passage, the plurality of holes connecting with the center member passage.

12. The hydraulic passage structure as claimed in claim 8, wherein the sleeve is made from a harder material than the housing and inserted from an axial direction into the inner circumference portion of the housing.

13. The hydraulic passage structure as claimed in claim 8, wherein the sleeve is made from a ferro-alloy.

14. The hydraulic passage structure as claimed in claim 13, wherein the sleeve is inserted from an axial direction into the inner circumference portion of the housing, and fixed to the housing.

15. The hydraulic passage structure as claimed in claim 14, wherein the sleeve is fixed at an insertion lead end thereof to the housing by a plurality of nuts.

16. A hydraulic passage structure of an automatic transmission having at least one friction element for gearshift, the friction element comprising a drum, the hydraulic passage structure comprising:

a housing;

a sleeve which is fitted into an inner circumference portion of the housing;

a center member joined integrally with the drum of the friction element, the center member being inserted in an inner circumference of the sleeve;

a radial passage formed in the housing;

a sleeve passage formed in the sleeve, the sleeve passage connecting with the radial passage of the housing; and a center member passage formed within the center member, the center member passage connecting the friction element and the sleeve passage, line pressure being supplied to the friction element via and in order of the radial passage, the sleeve passage, and the center member passage, wherein the sleeve passage comprises a plurality of axial grooves formed in an outer circumference of the sleeve to connect with the radial passage of the housing, and a plurality of radial openings formed in bottom surfaces of the plurality of axial grooves to connect with the center member passage.

17. A hydraulic passage structure of an automatic transmission having at least one friction element for gearshift, the friction element comprising a drum, the hydraulic passage structure comprising:

a housing;

a sleeve which is fitted into an inner circumference portion of the housing;

a center member joined integrally with the drum of the friction element, the center member being inserted in an inner circumference of the sleeve;

a radial passage formed in the housing;

a sleeve passage formed in the sleeve, the sleeve passage connecting with the radial passage of the housing; and a center member passage formed within the center member, the center member passage connecting the friction element and the sleeve passage, line pressure being supplied to the friction element via and in order of the radial passage, the sleeve passage, and the center member passage, wherein the center member passage comprises a plurality of grooves formed in an outer circumference of the center member which connects to the sleeve passage, and a plurality of holes formed inside the center member which connects the plurality of grooves and the friction element.

* * * * *